(No Model.) 2 Sheets—Sheet 1.

A. J. WOOD.
CORN PLANTER.

No. 316,424. Patented Apr. 21, 1885.

WITNESSES:
Chas. Nicla
C. Sedgwick

INVENTOR:
A. J. Wood
BY
ATTORNEYS.

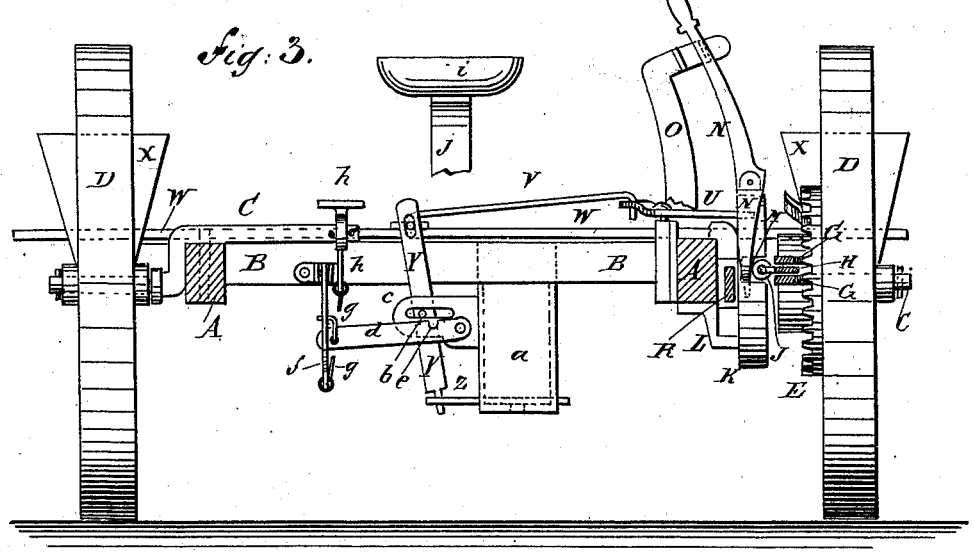
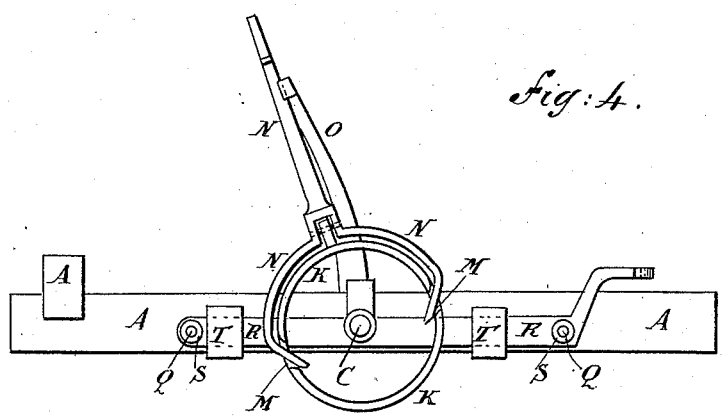
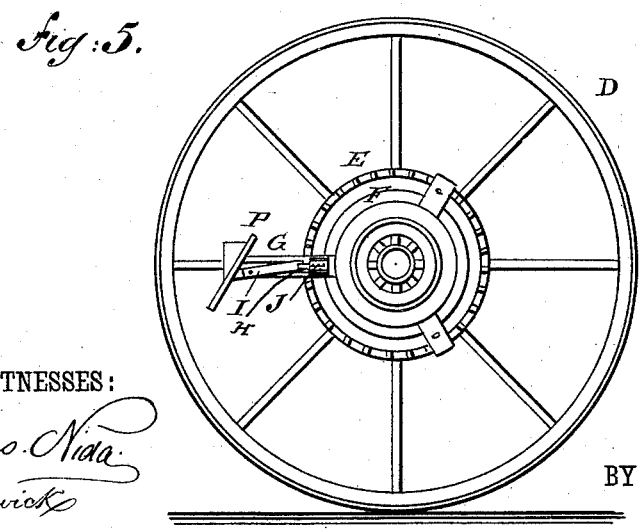

UNITED STATES PATENT OFFICE.

ALBERT J. WOOD, OF WILDER, KANSAS.

CORN-PLANTER.

SPECIFICATION forming part of Letters Patent No. 316,424, dated April 21, 1885.

Application filed November 18, 1884. (No model.)

*To all whom it may concern:*

Be it known that I, ALBERT JOHN WOOD, of Wilder, in the county of Johnson and State of Kansas, have invented a new and useful Improvement in Corn-Planters, of which the following is a full, clear, and exact description.

Reference is to be had to the accompanying drawings, forming a part of this specification, in which similar letters of reference indicate corresponding parts in all the figures.

Figure 1:
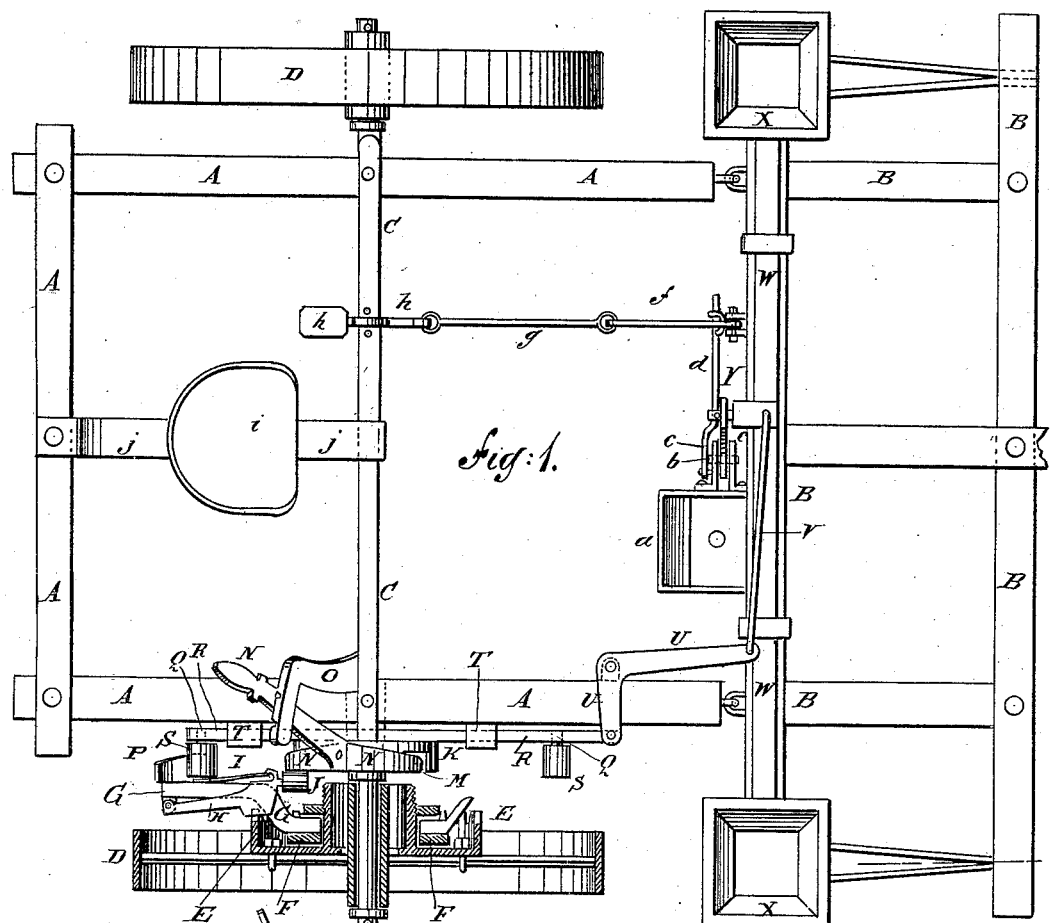
Figure 2:
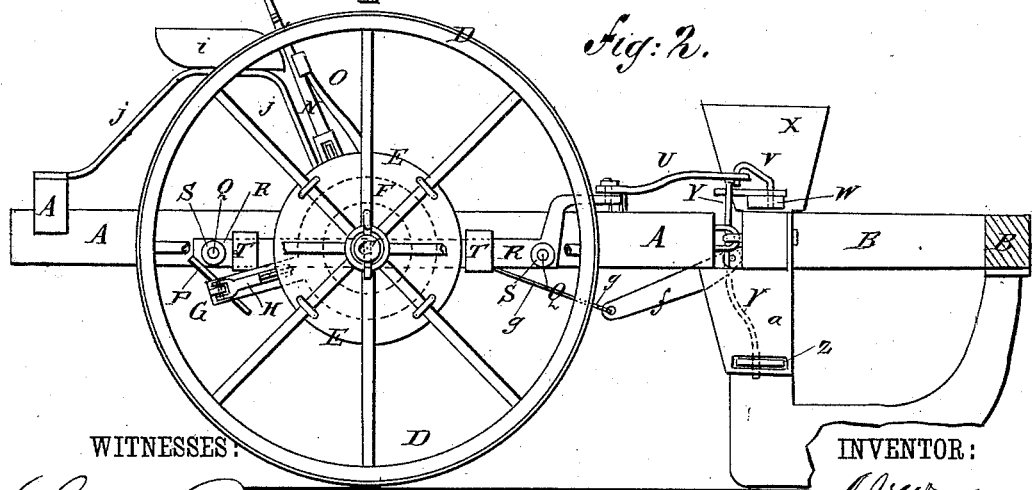

Figure 1, Sheet 1, is a plan view, partly in section, of a corn-planter to which my improvement has been applied. Fig. 2, Sheet 1, is a side elevation of the same, parts being broken away. Fig. 3, Sheet 2, is a sectional rear elevation of the same, parts being broken away. Fig. 4, Sheet 2, is a side elevation of the frame, and showing the sliding bar and the pawl-guide and its forked lever. Fig. 5, Sheet 2, is an elevation of the driving-wheel, showing its attachments.

The object of this invention is to promote accuracy in planting corn and other seeds in hills, and also to facilitate the throwing of the operating mechanism into and out of gear.

The invention relates to a corn-planter the drive-wheel of which is provided with a crown-wheel carrying a loose wheel provided with a rigid arm carrying an inclined plate and slotted to receive a spring-pressed pawl to engage with the said crown-wheel, and controlled by a recessed guide-ring and forked lever, the said inclined plate operating a sliding bar connected by an elbow-lever with the seed-dropping slide, whereby the said seed-dropping slide will be operated from the said drive-wheel and the mechanism can be readily thrown into and out of gear. With the seed-dropping slide is connected the dropping-slide of a hopper by a lever having a pin working in slotted lugs and engaged by a lever connected by a lever and rod with a foot-lever, whereby the said dropping-slide can be operated from the said seed-dropping slide, and can be readily thrown into and out of gear, as will be hereinafter fully described, and then claimed.

A represents the frame of the carriage, and B the frame of the planter. To the frame A is attached the axle C of the wheels D.

Upon the inner end of the hub of one of the wheels D is placed a crown-wheel, E, which is clamped or otherwise secured to the said wheel D.

Upon the hub of the crown-wheel E is placed a loose wheel, F, which is kept in place by a flange or collar formed upon or attached to the said hub. To the loose wheel F is rigidly attached an arm, G, which is bent to pass around the teeth of the crown-wheel E, and then projects radially. The arm G from its bend outward is slotted to receive the pawl H, the outer end of which is hinged to a lug formed upon or attached to the said arm G. The outer edge of the inner end of the pawl H, or a lip formed upon the said edge, engages with the teeth of the crown-wheel E when the said pawl is forced outward. The inner end of the pawl H, when the said pawl is free from outward pressure, is held out of gear with the teeth of crown-wheel E by a spring, I, connected with the inner end of the said pawl H and the outer end of the arm G.

Upon the inner end of the pawl H is pivoted a small roller, J, which rolls along the edge of a guide-ring, K, attached to the axle C, and to a bracket, L, attached to the frame A, or to some other suitable support. In the outer edge of the opposite sides of the guide-ring K are formed recesses M, to receive the inner end of the pawl H or the small roller pivoted to the said end, and allow the said pawl to be forced out of gear with the teeth of the crown-wheel E by the spring I. In the inner parts of the recesses M rest the inwardly-bent ends of the prongs of the forked lever N, which is pivoted to a lug formed upon or attached to the upper side of the guide-ring K or some other support, so that by moving the upper arm of the forked lever N inward to bring the ends of its prongs flush with the outer edge of the guide-ring K, the said prongs will close the outer ends of the recesses M, and cause the pawl H to pass the said recesses without entering them. By moving the upper arm of the lever N outward the prongs of the said lever will be brought into the inner parts of the recesses M, so as to allow the pawl H to enter the said recesses, and thus be thrown out of gear with the teeth of the crown-wheel E. The upper arm of the forked lever N moves along the catch-bar O, attached to the frame A, and which is provided with recesses to receive and hold the said lever when in either position.

Upon the inner side of the outer end of the arm G is formed or to it is attached an inclined plate, P, to come in contact, successively, with outwardly-projecting pins Q, formed upon or attached to the end parts of the bar R, or with rollers S, placed upon the said pins, so that the said bar R will be moved forward and back successively by the arm G as it is carried around by the wheels D E F. The bar R slides in keepers T, attached to a side-bar of the frame A, and to its forward end is pivoted the end of the short arm of the elbow-lever U, which is pivoted at its angle to the frame A or to a support attached to the said frame.

To the end of the long arm of the elbow-lever U is pivoted the end of a connecting-rod, V, the other end of which is pivoted to the seed-dropping slide W, by which the seed is taken from the seed-boxes X and dropped to the ground.

To the seed-dropping slide W, or to a support attached to the said slide, is pivoted the upper end of a lever, Y, the lower end of which is pivoted to the dropping-slide Z of the hopper a, attached to the rear cross-bar of the frame B. To the middle part of the lever Y is attached a pin, b, which passes through horizontal slots in the lugs c, attached to the hopper a, and between which the said lever Y is placed. With this arrangement, as the seed-dropping slide W is operated it vibrates the lever Y upon the slide Z, to which its lower end is pivoted, the pin b moving back and forth in the slots in the lugs c.

To the inner part of the rear lug c is pivoted the end of a lever, d, in the upper edge of which is formed a recess, e, to receive the pin b and hold it from sliding in the slots of the lugs c. The other end of the lever d is pivoted to the lever f at a little distance from its forward end. The forward end of the lever f is pivoted to the rear cross-bar of the frame B, and to its rear end is attached the forward end of a connecting-rod, chain, or cord, g. The rear end of the rod, chain, or cord g is attached to the forward end of the lever h, which is pivoted to the axle C or some other suitable support in such a position that its rear end can be readily reached and operated by the driver with his foot while sitting upon the seat i. The driver's seat i is attached to a support, j, secured to the frame A. With this construction, when the foot-lever h is operated the lever d will be raised, causing the pin b to enter the recess e in the said lever d, which then serves as a bearing for the said pin b, and causes the said pin to act as a pivot to the lever Y, so that the movement of the seed-dropping slide W will operate the slide Z.

The hopper a is designed to contain ashes, plaster, or other substance that can be seen when dropped to the ground, so that it can be used to mark the line of the last cross-rows, and thus serve as a guide to the driver in adjusting the machine for the next crossing.

When the driver removes his foot from the lever h, the weight of the connecting-rod g and of the levers f d will lower the lever d away from the pin b, and prevent the movements of the seed-dropping slide W from operating the slide Z, which thus remains stationary until the foot-lever h is again operated.

The loose wheel F is provided with short stubs, to which may be attached additional arms G to adapt the machine to be used as a drill.

Having thus described my invention, I claim as new and desire to secure by Letters Patent—

1. The combination, with the drive-wheel and the seed-slide, of the rotary crown-gear E, the loose wheel F, provided with an arm, G, extending beyond the crown-teeth, the inclined plate P on the outer end of said arm, the pawl H, pivoted at its outer end to the outer end of the arm G and constructed to engage the crown-teeth, the spring I, for pressing the pawl away from the crown-teeth, the fixed vertical guide-ring K, having notches M in its edge adapted to receive the opposite side of the pawl H from that which engages the crown-teeth, the forked lever N, having its arms within and adapted to close the notches M of the guide-ring to prevent the pawl H from entering therein, and to throw said pawl outward therefrom, and the sliding bar R, connected to the seed-slide and provided with projections in the path of the plate P, substantially as set forth.

2. In a corn-planter, the combination, with the seed-dropping slide Z, of the lever Y, pivoted to the said dropping-slides and having pin b, the slotted lugs c, to receive the said pin, the lever d, having recess e to engage with the said pin, and the levers f h, and their connecting-rod g, substantially as herein shown and described, whereby the said dropping-slide of the said hopper can be operated from the dropping-slide of the seed-boxes, and can be readily thrown into and out of gear, as set forth.

ALBERT J. WOOD.

Witnesses:
R. KESTLER,
R. L. GODDARD.